Aug. 17, 1943.   S. RUSSELL   2,327,067
COMBINE BALER
Original Filed Oct. 15, 1936   2 Sheets-Sheet 1
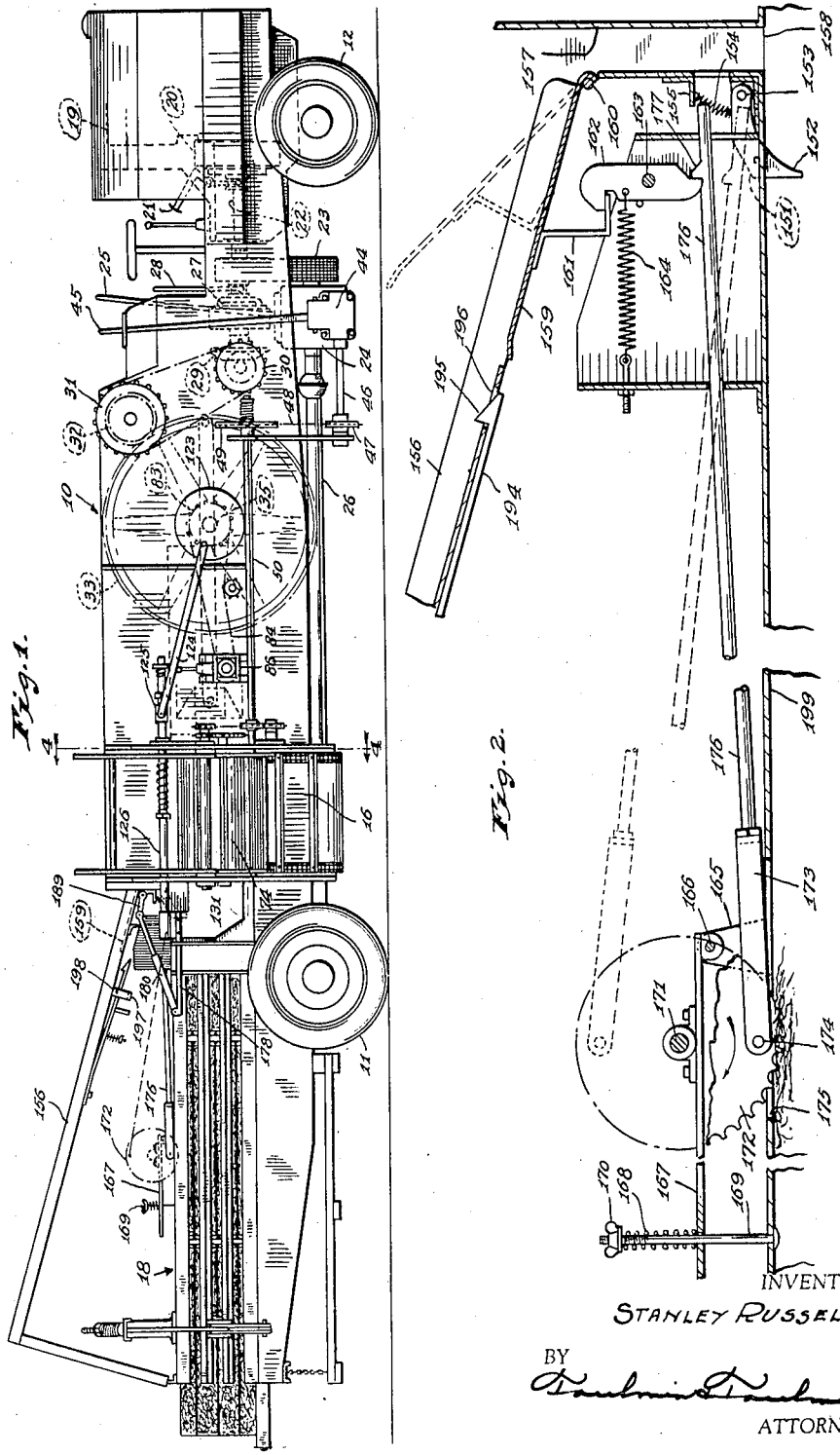
INVENTOR.
STANLEY RUSSELL,
BY
ATTORNEYS Aug. 17, 1943.  S. RUSSELL  2,327,067
COMBINE BALER
Original Filed Oct. 15, 1936  2 Sheets-Sheet 2
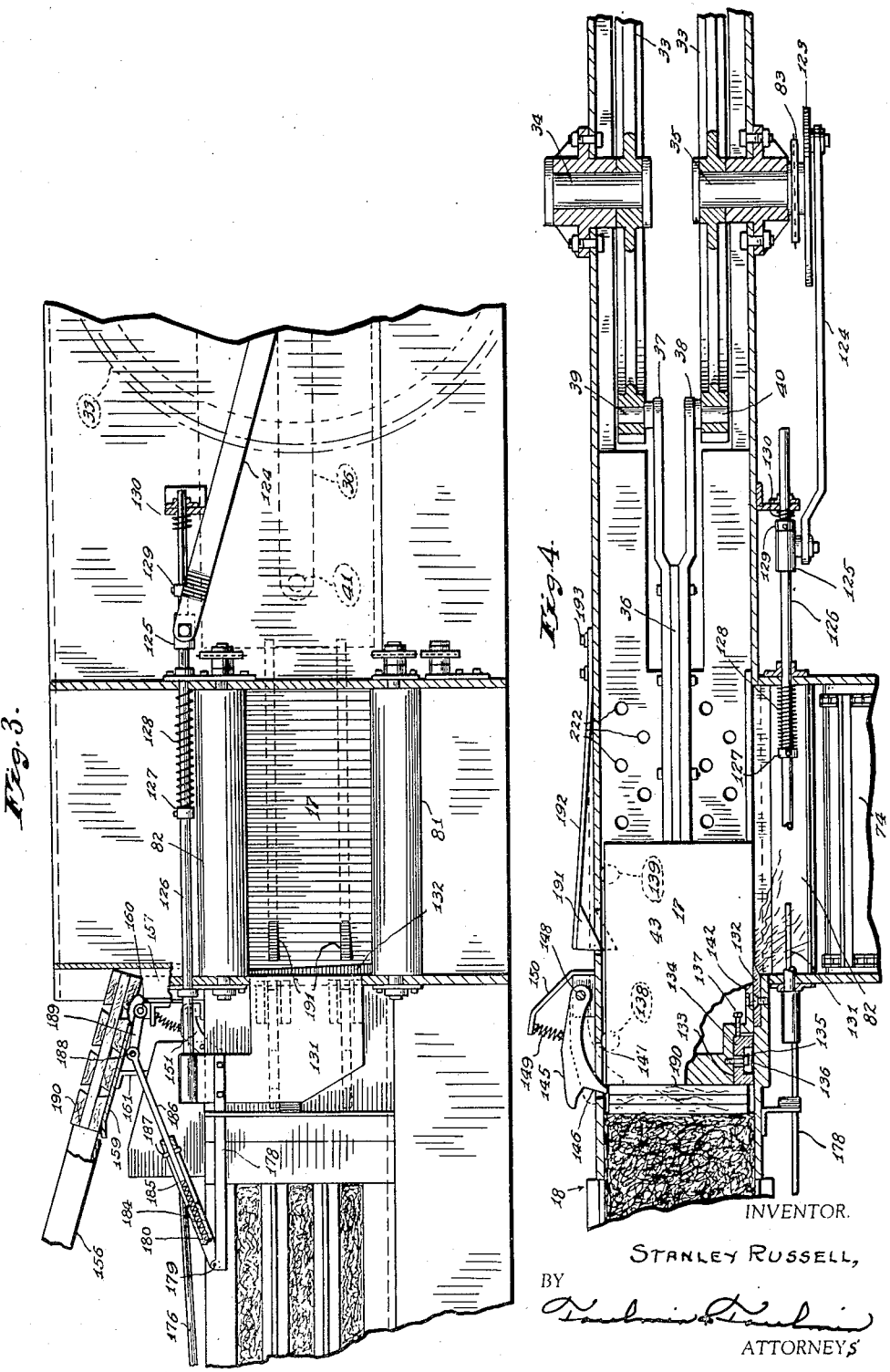
INVENTOR.
STANLEY RUSSELL,
BY
ATTORNEYS Patented Aug. 17, 1943

2,327,067

UNITED STATES PATENT OFFICE 2,327,067

COMBINE BALER

Stanley Russell, Racine, Wis., assignor to The Ohio Cultivator Company, Bellevue, Ohio, a corporation of Ohio Original application October 15, 1936, Serial No. 105,650. Divided and this application June 10, 1940, Serial No. 339,672

3 Claims. (Cl. 100—24)

The present application relates to a combine baler, and more particularly to a baler which shall be so constructed, and which shall operate in such a manner, that it may be automotively driven through a field in which the crop has been previously mowed, or in which the crop has been left standing or partially standing, and will pick up any portions of the crop which have been mowed, will mow any portions of the crop which have been left standing, and will automatically bale the material so picked up and/or mowed, in a continuous manner; automatically dropping blocks or boards into the baling chamber at predetermined intervals for facilitating the wiring of the bales.

This is a division of my copending application, Serial No. 105,650, filed October 15, 1936, and it is assigned to the same assignee as the present invention. The said copending application matured as Patent No. 2,208,056, July 16, 1940.

The primary object of my invention is, of course, to provide mechanism of the character above described, capable of carrying out the operations above described; but more specifically, the present application is directed to improvements upon structures which I have heretofore invented and which are disclosed in my Patent No. 2,180,852, granted November 21, 1939. Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

In the drawings:

Fig. 1 is a side elevation of an automotive continuous combine baler constructed in accordance with my invention;

Fig. 2 is an enlarged side elevation of a portion of the block dropping mechanism, parts being broken away and/or shown in section for clarity of illustration;

Fig. 3 is an enlarged longitudinal section of a fragment of the machine; and

Fig. 4 is a horizontal section taken in planes perpendicular to the plane of Fig. 3, and showing substantially the same details which are illustrated in Fig. 3.

Referring more particularly to the drawings, it will be seen that I have illustrated an automotive vehicle, indicated generally at 10, and mounted upon traction wheels 11 and steering wheels 12. The vehicle includes a pick-up reel (not shown) which feeds the material to conveyer 16 (Fig. 1) to be fed to the baler. This conveyer carries material to be baled to the mouth or inlet port 17 of a baling chamber indicated generally by the reference numeral 18.

Referring now to Fig. 1, it will be seen that the vehicle is provided with the usual engine 19 which drives, through the conventional clutch 20, controlled by the usual pedal 21, through a standard transmission 22 to a silent chain drive 23. The drive 23 drives a selective speed transmission 24, adapted to be controlled by a lever 25; and transmitting power to a propeller shaft housed in the usual tube 26 and connected to drive the traction wheels 11 of the vehicle. Beyond the chain drive 23, the direct drive from the transmission 22 extends through a clutch 27 controlled by a lever 28 to drive a beveled gear 29 connected to drive a sprocket 30 which, through the illustrated chain, drives a sprocket 31 mounted upon a shaft carrying a pair of pinions 32 meshing with a pair of bull gears 33 mounted upon stub axles 34 and 35 (see Fig. 4). A pitman 36 having furcations 37 and 38 mounted at 39 and 40 upon the peripheries of the respective bull gears 33, is connected at its opposite end, as at 41 (see Fig. 3), to a hollow plunger 43 (see Fig. 4). Obviously, rotation of the bull gears 33 will result in reciprocation of the plunger 43.

A standard power take-off 44 is connected to the transmission 24 and is controlled by a lever 45 to drive at will a shaft 46 carrying a sprocket 47 connected by a chain 48 to drive a sprocket 49 mounted on a shaft 50, extending longitudinally of the vehicle. Preferably, the sprocket 49 is connected to the shaft 50 through a riffle clutch.

The shaft 50 carries, near its rear end, a sprocket from which the feed means comprising conveyer 16, drum 74, and rollers 81 and 82 is operated. The details of this feed means form no part of the claimed invention.

The stub axle 35 (see Fig. 4) carries a sprocket 83 which through a chain 84 (see Fig. 1) drives a sprocket (not shown) carried by the input shaft of a selective speed transmission 86. Said transmission 86 drives a pick-up mechanism, the details of which form no part of my claimed invention and which may take any desired conventional form, said pick-up mechanism delivering material to feed conveyor 16 to be carried to the rolls 81 and 82 and thence to the baling chamber 18.

The stub shaft 35 (see Figs. 1 and 4) carries a disc 123 which operates a pitman 124 carrying at its outer end a sleeve 125 slidably mounted upon a rod 126 which is slidably mounted on the machine frame. Intermediate its ends, the rod 126 carries a stop collar 127 providing an abutment for one end of a spring 128 sleeved on said rod and bearing, at its opposite end, against a wall of the machine, so that the rod 126 is resiliently urged toward the left, as viewed in Figs. 3 and 4. To the right of said machine wall, said rod carries a second stop collar 129 which is adapted to be engaged by the sleeve 125, upon movement of the pitman 124 to the right, whereby the rod 126 will be shifted to the right. Preferably, a second small spring 130 is sleeved on said rod 126 between said stop collar 129 and an abutment carried on the machine frame.

The rod 126 carries at its rearward end an element which I have termed a flag 131 which as the rod 126 is moved toward the right will be drawn across the rearward end of the mouth 17 to clear away therefrom wisps of material jammed in that corner of the opening as a result of the shearing action of the knife 132 as the plunger 43 moves past the rearward end of the mouth 17.

The knife 132 is, as is clearly shown in Figs. 3 and 4, mounted at the rearward end of the mouth 17 of the baling chamber. At the forward end of the wall of the plunger 43 adjacent the mouth 17 of the baling chamber, said plunger is rabbeted as at 133 for the reception of a shear block 134 which is adjustably secured in place by bolts 135. Said shear block is chamfered, as at 136, so that it may be reversed to bring into cooperative relation with the blade 132 either edge of said block 134. Screws 137 are provided for adjusting the position of said block 134.

Assuming that the plunger 43 is in its retracted position, and that material is being fed into the baling chamber, it will be seen that as the plunger is advanced or moved toward the left as viewed in Fig. 4, there will be a tendency for the plunger to carry material toward the left across the mouth 17 of the baling chamber 18. As the advancing end of the plunger 43 approaches the knife 132, there is a tendency for the material being carried with the plunger to pile up against said knife; and when the block 134 strikes the knife 132, of course that material is cut; leaving a wad of material outside the mouth of the baling chamber and collected at the rearward edge of said mouth. Just as the block 134 begins to pass the blade 132, the sleeve 125 strikes the collar 129 and begins to shift the rod 126 toward the right, carrying the flag 131 likewise toward the right to engage that wad of material to shift it toward the middle of the mouth 17; whereby stacking of material at the knife end of the mouth 17 is prevented. As the plunger 43 starts back, the sleeve 125 is moved toward the left, and the springs 128 and 130 shift the flag 131 toward the left out of the path of advancing material.

The lateral dimension of the plunger 43 is somewhat less than the lateral dimension of the baling chamber 18, to permit the passage of air forwardly around the plunger as the plunger moves toward the left to compress the material within the baling chamber. In order to maintain a proper bearing of the plunger and block 134 against the adjacent wall of the baling chamber there are provided two pairs of rollers, each pair consisting of two vertically spaced rollers, the uppermost ones of which are indicated by numerals 138 and 139 (see Fig. 4) projecting through the wall of the plunger 43 and bearing against the adjacent wall of the baling chamber.

In order to hold the baled material against any tendency to expand toward the right upon withdrawal of the plunger 43, I provide a plurality of dogs 145 having fingers 146 projectible through openings 147 in a side wall of the baling chamber. Said dogs are so formed as to be moved outwardly out of the path of advancing material by advancing movement of the material; but they are pivoted as at 148 and are urged toward projection into the baling chamber by springs 149 bearing against brackets 150. I provide also a pair of similar dogs 151 (see Fig. 2) having fingers 152 projectible into the baling chamber, and similarly formed. Said dogs 151 are pivoted as at 153 and are urged toward projection into the baling chamber by springs 154 bearing against abutments 155. The dogs 145 are mounted on a side wall of the baling chamber, while the dogs 151 are mounted on the top wall thereof; and preferably there are also provided a pair of dogs (not shown) similar to the dogs 145, on the bottom wall of the baling chamber.

As is clearly shown in Figs. 1, 2 and 3, I provide a chute 156 leading from a point adjacent the rear end of the baling chamber 18 to a point immediately in advance of the dogs 145 and 151. As a bale is discharged from the baling chamber 18, its spacer block is likewise discharged, and is picked up by an attendant and dropped into the chute 156. It slides down that chute until (if there is no other block in the chute) it strikes the wall 157, the angle of the chute 156 and the spacing of the wall 157 therefrom being such as to hold the block against dropping into the passage defined by said wall and through the opening 158 into the baling chamber. The lower end of the chute 156 is formed by a platform 159 mounted at its lower end upon a rock shaft 160 and adapted to be tilted into the dotted line position of Fig. 2 to permit a block (see 190 of Fig. 3) to slide into the passage defined by the wall 157. On its lower surface, the platform 159 carries a depending latch bracket 161 with which cooperates a latch 162 pivoted at 163 and urged into engaging position by a spring 164. As long as the latch 162 is engaged with the latch bracket 161, the platform 159 cannot be tilted into block-dropping position.

The top wall 199 of the baling chamber extension carries a pair of brackets 165 in which is journaled a rock shaft 166 carrying an arm 167. A spring 168 sleeved on a post 169 urges said arm 167 downwardly under a tension variable by adjustment of the nut 170. Said arm 167 carries journal mountings for a shaft 171 upon which are fixed a pair of toothed wheels 172 which are adapted to project through slots 175 in the wall 199 into driving engagement with the baled material advancing through said baling chamber extension. The tension of the spring 168 being suitably adjusted, it will be obvious that the wheels 172 will be rotated, by movement of baled material through the baling chamber extension at a rate directly proportional to the rate of movement of material through said extension. A yoke 173 has its furcations respectively pivoted, as at 174, upon the respective wheels 172; and said yoke is connected to a rod 176 which is provided with a finger 177 engageable with the lower end of the latch member 162. It will be obvious that, as the wheels 172 rotate in a clockwise direction, as viewed in Fig. 2, the unit 173, 176 will be moved toward the left to swing the latch member 162 in a clockwise direction to disengage the same from the latch bracket 161. When the unit 173, 176 reaches the position illustrated in dotted lines in Fig. 2, the finger 177 has dropped to a position such that, as the wheels 172 continue to rotate in a clockwise direction, the finger will be shifted toward the right and upwardly to engage again the lower end of the latch member 162.

As is clearly shown in Fig. 3, the flag 131 carries a slidable strap 178 to the rearward end of which is pivoted, as at 179, a tube 180 receiving a compression spring 184. Said tube is provided with diametrically opposed slots 185; and receives a rod 186 provided with a pin 187 received in the slots 185. The upper end of the rod 186 is pivoted, as at 188, to a lever 189 carried on the rock shaft 160. Obviously, as the rod 126 is moved toward the right, the tube 180 is likewise moved toward the right, placing the spring 184 under tension and tending to move the lever 189 and the rock shaft 160 in a clockwise direction to tilt the platform 159 toward the dotted line position of Fig. 2. If the latch 162 is at that time engaged with the latch bracket 161, the door obviously cannot be tilted, and the movement of the strap 178 and tube 180 is absorbed by the spring 184. However, since this movement of the strap 178 toward the right and then toward the left, as viewed in Fig. 3, occurs with every rotation of the bull gears 33, it will be obvious that, when the wheels 172 have been rotated to such a position as to release the latch member 162 from the latch bracket 161, the next movement of the strap 178 toward the right, as viewed in Fig. 3, will tilt the platform 159 into the dotted line position of Fig. 2 to cause the block 190 to drop through the port 158 into the baling chamber. This operation will occur at a moment when the plunger 43 is in its rearmost position, so that the block will fall onto the top wall of said plunger. As the plunger is then retracted, the block will drop into the baling chamber between the dogs 145 and 151 and the dogs 191 which are mounted upon leaf springs 192, suitably secured to the outer wall of the baling chamber by bolts 193, or the like, and which project into the baling chamber in such position as to prevent the block from toppling out of its substantially vertical position. The next reciprocation of the plunger 43 toward the left will bring the parts into a position slightly beyond that illustrated in solid lines in Fig. 4, so that the dogs 145 and 151 will, upon retraction of the plunger, drop into position to hold the block 190 against retrograde movement.

In case an unnecessarily large number of boards are to be used, I have provided an arm 194 having a tooth 195 adapted to be projected through a slot 196 in the floor of the chute 156 to hold additional boards against sliding under the platform 159 when the same is in the dotted line position of Fig. 2. In most instances, however, this element will not be needed; and therefore I have provided a bracket 197 adapted to receive a pin 198 to hold the element 194 in inoperative position, as is illustrated in Fig. 1.

It will be understood that I desire to comprehend as within my invention such modifications and improvements as come within the scope and spirit of the appended claims.

Having thus fully described my invention, what I claim as new and desire to secure by Letters Patent is:

1. In a baling apparatus having a movable support for dropping boards, and latch means for releasing said support, control means for said latch means comprising a wall of a bale chamber having an opening therein, a bracket adjacent said opening, a support pivoted on the bracket and positioned above the opening, a toothed wheel mounted on the support and rotatable within the opening, means secured to said wall for slidably mounting the support with reference to said wall, means mounted on the first-named means for adjusting the position of the support with respect to said wall, and means secured to the toothed wheel adapted to operate the latch.

2. In a baling apparatus having a movable support for dropping boards, and latch means for releasing said support, control means for said latch means comprising a wall of a bale chamber having an opening therein, a toothed wheel projecting through said opening and having a rotatable crank adapted to be rotated by the longitudinal movement of the material being baled as it passes through the bale chamber, said wheel being adjustably and resiliently mounted on the wall of said chamber, and a rod positively connected to said crank for effecting the operation of the latch.

3. In a baling apparatus having a movable support for dropping boards and latch means for releasing said support, control means for said latch means comprising a wall of a bale chamber having an opening therein, a rotatable toothed wheel extending through said opening and adapted to bite into the material in the bale chamber as it moves through said chamber, a crank on said wheel and a rod positively connected with said crank and adapted to operate the latch, and means for resiliently mounting said toothed wheel on the wall of said chamber, said means including an arm swingably supported from said wall to permit adjustment of its free end toward and away from said wall and a spring urged mechanism for determining the position of the arm with respect to the wall of said chamber and thereby determining the position of the crank with respect to the material as it passes through said chamber.

STANLEY RUSSELL.